(12) United States Patent
Xiong

(10) Patent No.: US 10,707,763 B1
(45) Date of Patent: Jul. 7, 2020

(54) PARTIALLY CLAMPED RESONANT HALF-BRIDGE CONVERTER FOR HIGHLY EFFICIENT CONSTANT POWER LED DRIVER WITH INHERENT HARD-SWITCHING PROTECTION

(71) Applicant: UNIVERSAL LIGHTING TECHNOLOGIES, INC., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/520,824

(22) Filed: Jul. 24, 2019

Related U.S. Application Data

(60) Provisional application No. 62/713,585, filed on Aug. 2, 2018.

(51) Int. Cl.
| | |
|---|---|
| *H02M 3/335* | (2006.01) |
| *H02M 1/32* | (2007.01) |
| *H05B 45/37* | (2020.01) |
| *H05B 45/50* | (2020.01) |

(52) U.S. Cl.
CPC ............ *H02M 3/335* (2013.01); *H02M 1/32* (2013.01); *H02M 3/33569* (2013.01); *H05B 45/37* (2020.01); *H05B 45/50* (2020.01)

(58) Field of Classification Search
CPC .... H02M 3/335; H02M 1/32; H02M 3/33569; H05B 45/50; H05B 45/37
See application file for complete search history.

(56) References Cited

U.S. PATENT DOCUMENTS

| | | | |
|---|---|---|---|
| 8,723,428 B2 | 5/2014 | Yao | |
| 8,847,512 B1 * | 9/2014 | Xiong | ............... H05B 41/295 |
| | | | 315/244 |
| 9,065,343 B2 * | 6/2015 | Hu | .................. H02M 3/33507 |
| 9,419,514 B1 * | 8/2016 | Xiong | .................. H02M 1/4208 |
| 9,769,890 B1 | 9/2017 | Xiong et al. | |
| 9,853,555 B2 * | 12/2017 | Ramabhadran | ... H02M 3/33546 |
| 10,098,202 B1 * | 10/2018 | Xiong | .................... H05B 45/10 |
| 2018/0027619 A1 * | 1/2018 | Xiong | .................... H02M 1/36 |
| | | | 315/291 |

* cited by examiner

*Primary Examiner* — Kyle J Moody
(74) *Attorney, Agent, or Firm* — Patterson Intellectual Property Law, P.C.; Gary L. Montle; Jerry Turner Sewell

(57) ABSTRACT

A resonant tank circuit for a DC-to-DC converter includes a resonant inductor having a first terminal connected to a switching node of a half-bridge switching circuit. The resonant inductor has a second terminal connected to resonant tank circuit output node. A first capacitor has a first terminal connected to a voltage reference and has a second terminal connected to a capacitor branch node. A second capacitor has a first terminal connected to the capacitor branch node and has a second terminal connected to the resonant tank output node. A first diode has an anode connected to the voltage reference and has a cathode connected to the capacitor branch node. A second diode has an anode connected to the capacitor branch node and has a cathode connected to a voltage rail.

11 Claims, 5 Drawing Sheets

US 10,707,763 B1

PARTIALLY CLAMPED RESONANT HALF-BRIDGE CONVERTER FOR HIGHLY EFFICIENT CONSTANT POWER LED DRIVER WITH INHERENT HARD-SWITCHING PROTECTION

CROSS-REFERENCE TO RELATED APPLICATION

This application claims the benefit under 35 USC. § 119(e) of U.S. Provisional Application No. 62/713,585, filed Aug. 2, 2018, entitled "Partially Clamped Resonant Half-Bridge Converter for High Efficient Constant Power LED Driver with Inherent Hard-Switching Protection," which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to power supply circuits having half-bridge isolated resonant type DC-DC converters, and, more particularly, relates to power supply circuits used as driver circuits for light-emitting diodes (LEDs).

BACKGROUND

A typical power supply circuit for driving LEDs receives power from an AC source. During a normal mode of operation, the power supply circuit generates either a constant voltage or a constant current to a DC load. The power supply circuit includes a first-stage power factor correction circuit that operates to maintain the current drawn from the AC source substantially in phase with the voltage of the AC source. The power factor correction circuit provides a first-stage output voltage to a second-stage DC-to-DC converter circuit. The second-stage DC-to-DC converter circuit generates the constant voltage or the constant current for the DC load.

The second-stage DC-to-DC converter can be configured as a resonant type DC-to-DC converter. A typical resonant type DC-to-DC converter can include a gate driver integrated circuit (IC) that generates a first gate driver signal to a first metal oxide semiconductor transistor (MOSFET) and generates a second gate driver signal to a second MOSFET. The two MOSFETs are connected in a half-bridge configuration. The two MOSFETS drive the primary winding of an output transformer via a resonant inductor. A resonant capacitor is connected across the primary winding. A center-tapped secondary winding has the center tap connected to a secondary ground reference. A first output terminal of the secondary winding is connected to a first diode. A second output terminal of the secondary winding is connected to a second diode. The two diodes are configured as half-bridge rectifier that drives a DC load, such as a plurality of light-emitting diodes (LEDs). An output filter capacitor is connected across the DC load. A current sense resistor is connected between the DC load and the secondary ground reference and generates a feedback voltage proportional to the current through the DC load. The feedback voltage is connected to a microcontroller, which also receives a dimmer control signal from a control source. The microcontroller compares the feedback voltage to the dimmer control signal and adjusts a frequency control signal to the gate driver IC to cause the gate driver IC to adjust the frequency of the first and second gate driver signals to thereby control the current provided to the DC load.

An LED driver should be sufficiently reliable to survive abnormal transient conditions, such as a sudden load removal, a shorted load, start into an open load, or the like, so that the LED driver resumes normal operation after the abnormal condition is no longer present. The above-described typical LED driver with the resonant type half-bridge converter has a drawback that hard-switching can occur during an abnormal transient condition. In a resonant type half-bridge converter, the two MOSFETs are switched such that the transitions between the on states and the off states occur at low (or zero) current levels when the circuit is operating normally. During an abnormal transient condition, hard-switching can occur such that the transitions between the on states and the off states of the MOSFETs occur at higher current levels. Hard-switching results in increased wasted power during the switching transitions and can result the failure of one or both MOSFETs and failure of the overall LED driver.

SUMMARY

A need exists to prevent hard-switching of the MOSFETs during an abnormal transient condition that can occur in response to a sudden load removal, a shorted load, or the like.

One aspect in accordance with the embodiments disclosed herein is a resonant tank circuit for a DC-to-DC converter. The resonant tank circuit includes a resonant inductor having a first terminal connected to a switching node of a half-bridge switching circuit. The resonant inductor has a second terminal connected to resonant tank circuit output node. A first capacitor has a first terminal connected to a voltage reference and has a second terminal connected to a capacitor branch node. A second capacitor has a first terminal connected to the capacitor branch node and has a second terminal connected to the resonant tank output node. A first diode has an anode connected to the voltage reference and has a cathode connected to the capacitor branch node. A second diode has an anode connected to the capacitor branch node and has a cathode connected to a voltage rail.

Another aspect in accordance with the embodiments disclosed herein is a resonant tank circuit. The resonant tank circuit has an input configured to connect to an output node of a half-bridge driver circuit that drives the output node between a rail voltage on a voltage rail and a reference voltage on a voltage reference. The resonant tank circuit has an output configured to connect to a primary circuit of an output transformer. The resonant tank circuit comprises a resonant inductor having a first terminal connected to the input of the resonant tank circuit and having a second terminal connected to the output of the resonant tank circuit. A first capacitor has a first terminal connected to the voltage reference and has a second terminal connected to a capacitor branch node. A second capacitor has a first terminal connected to the capacitor branch node and has a second terminal connected to the resonant tank output node. A first diode is connected across the first capacitor between the voltage reference and the capacitor branch node. A second diode is connected from the capacitor branch node and to the voltage rail.

In certain embodiments in accordance with this aspect, the voltage reference is a circuit ground, and the rail voltage is a positive voltage with respect to the circuit ground. An anode of the first diode is connected to the circuit ground; and a cathode of the first diode is connected to the capacitor branch node. An anode of the second diode is connected to the capacitor branch node; and a cathode of the second diode is connected to the rail voltage.

Another aspect in accordance with the embodiments disclosed herein is a DC to DC converter that receives a rectified DC voltage on a voltage rail and that generates a DC output voltage. The DC-to-DC converter comprises a gate driver circuit that drives at least a first switching device and a second switching device. The first switching device is connected between the voltage rail and a switching node. The second switching device is connected between the switching node and a voltage reference. The DC to DC converter further comprises a tank circuit having an input connected to the switching node and having an output connected to a resonant tank output node. The resonant tank circuit comprises a resonant inductor having a first terminal connected to the switching node and having a second terminal connected to the resonant tank output node. A first capacitor has a first terminal connected to the voltage reference and has a second terminal connected to a capacitor branch node. A second capacitor has a first terminal connected to the capacitor branch node and has a second terminal connected to the resonant tank output node. A first diode is connected across the first capacitor between the voltage reference and the capacitor branch node. A second diode is connected from the capacitor branch node to the voltage rail. An output transformer has a primary circuit and a secondary circuit. The primary circuit has a first terminal connected to the resonant tank output node and has a second terminal connected to the voltage reference. A rectifier circuit is connected to the secondary circuit of the output transformer. The rectifier circuit generates the DC output voltage.

In certain embodiments in accordance with this aspect, the voltage reference is a circuit ground; and the rail voltage is a positive voltage with respect to circuit ground. An anode of the first diode is connected to the circuit ground; and a cathode of the first diode is connected to the capacitor branch node. An anode of the second diode is connected to the capacitor branch node; and a cathode of the second diode is connected to the rail voltage.

In certain embodiments in accordance with this aspect, the primary circuit of the output transformer has a primary winding and the secondary circuit of the transformer has at least one secondary winding. The primary winding has N turns for each turn of the secondary winding. The first and second diodes of the resonant tank circuit enable a value of N to be optimized to a large value to maximize a voltage applied to the primary winding and to minimize a current through the primary winding.

In certain embodiments in accordance with this aspect, the primary circuit of the output transformer includes a DC-blocking capacitor in series with the primary winding.

Another aspect in accordance with the embodiments disclosed herein is a method for preventing hard-switching of at least first and second switching devices in a half-bridge circuit in a DC-to-DC converter. The DC-to-DC converter receives an input voltage from a voltage rail. The input voltage is referenced to a reference voltage from a voltage reference. The method comprises providing an output of the half-bridge circuit to a resonant tank circuit. The resonant tank circuit comprises a resonant inductor having an input connected to the output of the half-bridge circuit and having an output connected to a primary circuit of an output transformer. The method further comprises connecting a first capacitor and a second capacitor in series between the output of the resonant inductor and the voltage reference. The first and second capacitors are connected at a capacitor branch node. The method further comprises connecting a first diode across the first capacitor between the voltage reference and the capacitor branch node; and connecting a second diode from the capacitor branch node to the voltage rail. The method further comprises clamping a voltage on the first capacitor at the capacitor branch node to prevent the voltage on the first capacitor from exceeding the input voltage by more than a voltage drop of the second diode and to prevent the input voltage from being less than the reference voltage by more a voltage drop of the second clamping diode. Clamping the voltage across the first capacitor prevents hard-switching of the switching devices in the half-bridge circuit.

In certain embodiments in accordance with this aspect, the resonant tank circuit has a first resonant frequency when the first and second diodes are not clamping the voltage on the first capacitor at the capacitor branch node. The resonant tank circuit has a second resonant frequency when the first and second diodes are clamping the voltage on the first capacitor at the capacitor branch node. The second resonant frequency is lower than the first resonant frequency.

In certain embodiments in accordance with this aspect, the voltage reference is a circuit ground; and the input voltage is a positive voltage with respect to the circuit ground. The first diode has a cathode connected to the circuit ground and has an anode connected to the capacitor branch node. The second diode has an anode connected to the capacitor branch node and has a cathode connected to the voltage rail.

In certain embodiments in accordance with this aspect, the primary circuit of the output transformer has a primary winding. A secondary circuit of the transformer has at least one secondary winding. The primary winding has N turns for each turn of the secondary winding. The first and second diodes of the resonant tank circuit enable a value of N to be optimized to a large value to maximize the voltage applied to the primary winding and to minimize a current through the primary winding.

In certain embodiments in accordance with this aspect, the primary circuit of the output transformer includes a DC-blocking capacitor in series with the primary winding.

BRIEF DESCRIPTIONS OF THE SEVERAL VIEWS OF THE DRAWINGS

FIG. 1 illustrates a topology of a typical conventional two-stage electronic switching power supply that includes a DC-to-DC converter that drives the primary winding of an output transformer via a resonant tank circuit, the resonant tank circuit including a resonant capacitor connected across the primary winding.

FIG. 2 illustrates a modified topology of a two-stage electronic switching power supply that includes a DC-to-DC converter that drives a primary winding of an output transformer via a resonant tank circuit, the resonant tank circuit including a resonant capacitor connected across the primary winding, the resonant tank circuit further including a first diode connected across the resonant capacitor and a second diode connected from the resonant capacitor to a voltage rail FIG. 3 illustrates a representation of the output transformer of FIGS. 1 and 2 as an ideal transformer with lossless windings, with an inductor representing the magnetizing inductance of the transformer and with the resonant capacitor of FIGS. 1 and 2 connected across the magnetizing inductance and the ideal primary winding.

FIG. 4 illustrates the representation of the output transformer of FIG. 3 with the primary winding replaced with a current source representing the current reflected from the secondary winding to the primary winding.

FIG. 5 illustrates an improved version of the two-stage electronic switching power supply of FIGS. 1 and 2 with the single resonant capacitor of FIGS. 1 and 2 in the resonant tank circuit replaced with a first resonant capacitor and second resonant capacitor connected in series across the primary winding of the output transformer, the resonant tank circuit further including a first diode connected across the first resonant capacitor and a second diode connected from a first terminal of the first resonant capacitor to a voltage rail.

DETAILED DESCRIPTION

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

Figure 1:
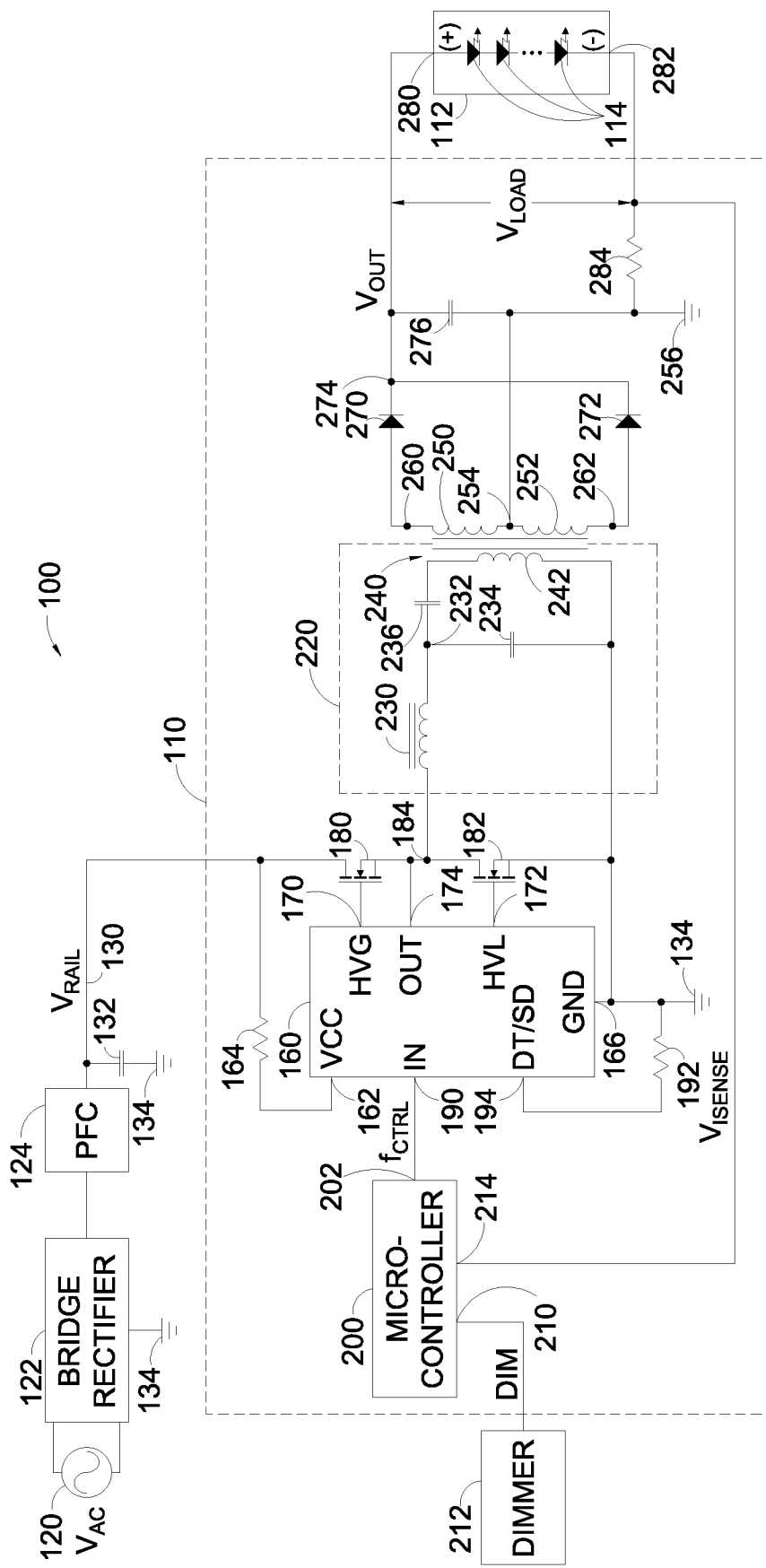

FIG. 1 illustrates a typical power supply 100, which includes a conventional half-bridge isolated resonant type DC-to-DC converter 110. The DC-to-DC converter is connected to drive a DC load 112 at a selectable constant current. In the illustrated embodiment, the DC load comprises a plurality of LEDs 114. The power supply receives input power from an AC source 120. The AC input voltage is converted to a rectified DC voltage by a bridge rectifier circuit 122. A conventional power factor correction (PFC) circuit 124 receives the rectified DC voltage as an input and generates a rail voltage $V_{RAIL}$ as an output on a voltage rail 130. The rail voltage is filtered by an input filter capacitor 132. The input filter capacitor has a first terminal connected to the voltage rail and has a second terminal connected to a primary side ground reference 134. The rail voltage is provided as the input voltage to the DC-to-DC converter of the power supply. The structures and operations of the bridge rectifier circuit and the PFC circuit are well known in the art and are not described herein.

The DC-to-DC converter 110 of FIG. 1 comprises a gate driver integrated circuit (IC) 160. In the illustrated embodiment, the driver IC circuit comprises an L6384E high voltage half-bridge driver, which is commercially available from STMicroelectronics of Geneva, Switzerland. Other similar gate driver ICs from other sources may also be used.

A first terminal ($V_{CC}$) 162 of the gate driver IC 160 is connected to the voltage rail 130 via a current limiting resistor 164 to receive the rail voltage $V_{RAIL}$. The supply voltage is clamped within the gate driver IC to an operating voltage for the circuitry within the gate driver IC. A second terminal (GND) 166 of the gate driver IC is connected to the primary side ground reference 134.

The gate driver IC 160 has a first gate driver output terminal (HVG) 170, a second gate driver output terminal (LVG) 172 and a voltage reference input terminal ($V_{OUT}$) 174. The first gate driver output terminal is connected to a control (gate) terminal of a first switching device 180. The second gate driver output terminal is connected to a control (gate) terminal of a second switching device 182. In the illustrated embodiment, the first and second switching devices are n-channel, enhancement mode metal oxide semiconductor transistors (MOSFETs). Each MOSFET has a respective drain terminal and a respective source terminal. In the illustrated embodiment, the drain terminal of the first MOSFET 180 is connected to the voltage rail 130, and the source of the first MOSFET is connected to a switching output node 184. The drain terminal of the second MOSFET 182 is connected to the switching output node. The source terminal of the second MOSFET is connected to the primary side ground reference 134. The switching output node is also connected to the voltage reference input terminal ($V_{OUT}$) of the gate driver IC.

The gate driver IC 160 controls the first gate driver output terminal (HVG) 170 and the second gate driver output terminal (LVG) 172 in response to a frequency reference signal $f_{CTRL}$ received on an input terminal (IN) 190. The gate driver IC alternately turns on the first MOSFET 180 to drive the switching output node 184 to a high voltage (e.g., approximately the magnitude of $V_{RAIL}$) and turns on the second MOSFET 182 to drive the switching output node to a low voltage (e.g., approximately the voltage level of the primary side ground reference 134). The gate driver IC interposes a deadtime between switching off the first MOSFET and switching on the second MOSFET to assure that both MOSFETs are not conducting at the same time. The gate driver IC interposes the same or a similar deadtime between turning off the second MOSFET and turning on the first MOSFET. The duration of the deadtime is controlled by a deadtime selection resistor 192. The deadtime selection resistor has a first terminal connected to a deadtime control terminal (DT/SD) 194 of the gate driver IC and has a second terminal connected to the primary side ground reference 134. The deadtime can be set between approximately 0.4 microseconds and approximately 3.1 microseconds by selecting a resistance of the deadtime resistor between approximately 47,000 ohms and approximately 270,000 ohms.

The gate driver IC 160 receives the frequency reference signal ($f_{CTRL}$) on the input (IN) terminal 190 from an output terminal 202 of a microcontroller 200. In the illustrated embodiment, the frequency control signal is an oscillating digital signal having a variable frequency. The microcontroller generates the frequency control signal in response to a dimmer control signal (DIM) received on a first input terminal 210 from a dimmer 212. The dimmer can generate the dimmer control signal as an analog or as a digital signal. The dimmer signal is communicated from the dimmer to the microcontroller via wires, via light (e.g., visible or infrared) or via radio frequency communications. The dimmer control signal represents a magnitude of a desired current flowing through the LED load to provide a desired illumination level. The magnitude represented by the dimmer control signal is compared to a magnitude of a sensed current signal $V_{ISENSE}$ (described below) received on a second input terminal 214. When the magnitude of the sensed current signal differs from the magnitude of the desired current, the microcontroller increases or decreases the frequency of the frequency control signal until the magnitude of the sensed current signal is approximately the same as the magnitude of the desired current.

The switching output node 184 connecting the source of the first MOSFET 180 to the drain of the second MOSFET 182 is connected the input of a resonant tank circuit 220. The input to the resonant tank circuit is a first terminal of a resonant inductor 230. A second terminal of the resonant inductor is connected to a resonant node 232. The resonant node is connected to a first terminal of a resonant capacitor 234. A second terminal of the resonant capacitor is connected to the primary side ground reference 134.

The resonant node 232 is also connected to the first terminal of a DC-blocking capacitor 236. A second terminal of the DC-blocking capacitor is connected to a first terminal of a primary winding 242 of an output transformer 240. A second terminal of the primary winding of the output transformer is connected to the primary side ground reference 134. As illustrated, the resonant capacitor is connected across the series combination of the DC-blocking capacitor and the primary winding of the output transformer. The resonant inductor, the resonant capacitor and the magnetizing inductance of the primary winding operate as a tank resonant circuit with a tank resonant frequency selected to be in the range of operating frequencies for the gate driver IC 160. The capacitance of the DC-blocking capacitor is sufficiently small as to have an insignificant effect at the AC switching frequencies. Accordingly, the effect of the DC-blocking capacitor can be ignored when for determining the tank resonant frequency. The DC-blocking capacitor in series with the primary winding of the output transformer are referred to herein as the primary circuit of the output transformer.

The output transformer 240 has a first secondary winding 250 and a second secondary winding 252. The two secondary windings are interconnected at a center tap 254. The center tap is connected to a secondary side ground reference 256. The first secondary winding has a first secondary winding output terminal 260. The second secondary winding has a second secondary winding output terminal 262. The two windings are configured such that the two secondary winding output terminals have opposite polarities with respect to the secondary side ground reference.

The first secondary winding output terminal 260 is connected to an anode of a first rectifier diode 270. The second secondary winding output terminal 262 is connected to an anode of a second rectifier diode 272. The cathodes of the two rectifier diodes are interconnected at a secondary output node 274. The secondary output node is connected to a first terminal of a secondary filter capacitor 276. A second terminal of the secondary filter capacitor is connected to the secondary side ground reference 256.

The secondary output node 274 is also connected to a positive (+) input terminal 280 of the DC load 112. The DC load has a negative (−) input terminal 282, which is connected to a first terminal of a current sensing resistor 284. In the illustrated embodiment, the current sensing resistor has a very small resistance (e.g., 0.1 ohm or less). A second terminal of the current sensing resistor is connected to the secondary side ground reference 256. A load voltage $V_{LOAD}$ is applied across the DC load from the positive input terminal to the negative input terminal. In the illustrated embodiment, the load voltage $V_{LOAD}$ and the output voltage $V_{OUT}$ are substantially the same. The small voltage drop across the current sensing resistor is insignificant with respect to the output voltage $V_{OUT}$ and the load voltage $V_{LOAD}$. The applied load voltage causes a load current to flow through the DC load and through the current sensing resistor. The load current causes a voltage $V_{ISENSE}$ on the first terminal of the current sensing resistor that is proportional to the load current. The voltage $V_{ISENSE}$ on the first terminal of the current sensing resistor is a feedback signal that is fed back to the second input terminal 214 of the microcontroller 200 for comparison with the dimmer control signal (DIM) on the first input terminal 210 of the microcontroller. As described above, the microcontroller is responsive to a difference between the feedback signal (representing the magnitude of the load current) and the dimmer control signal to vary the frequency reference signal $f_{CTRL}$ applied to the input (IN) terminal 190 of the gate drive IC 160 until the two signals have substantially the same magnitudes.

One disadvantage of the DC-to-DC converter 110 illustrated in FIG. 1 is the capability of the DC-to-DC converter to withstand certain transient abnormal conditions, such as a sudden load removal, a shorted load, start into an open load, or the like. When such a transient condition occurs, the DC-to-DC convertor can begin operating in a hard-switching mode during which gate driver IC 160 turns off one the first and second MOSFETs at a time when significant current is flowing through the MOSFET. Switching at such times causes the MOSFET to dissipate power during the switching transitions. The power dissipation can cause one or both MOSFETs to fail quickly and thus cause the DC-to-DC converter to fail.

Figure 2:
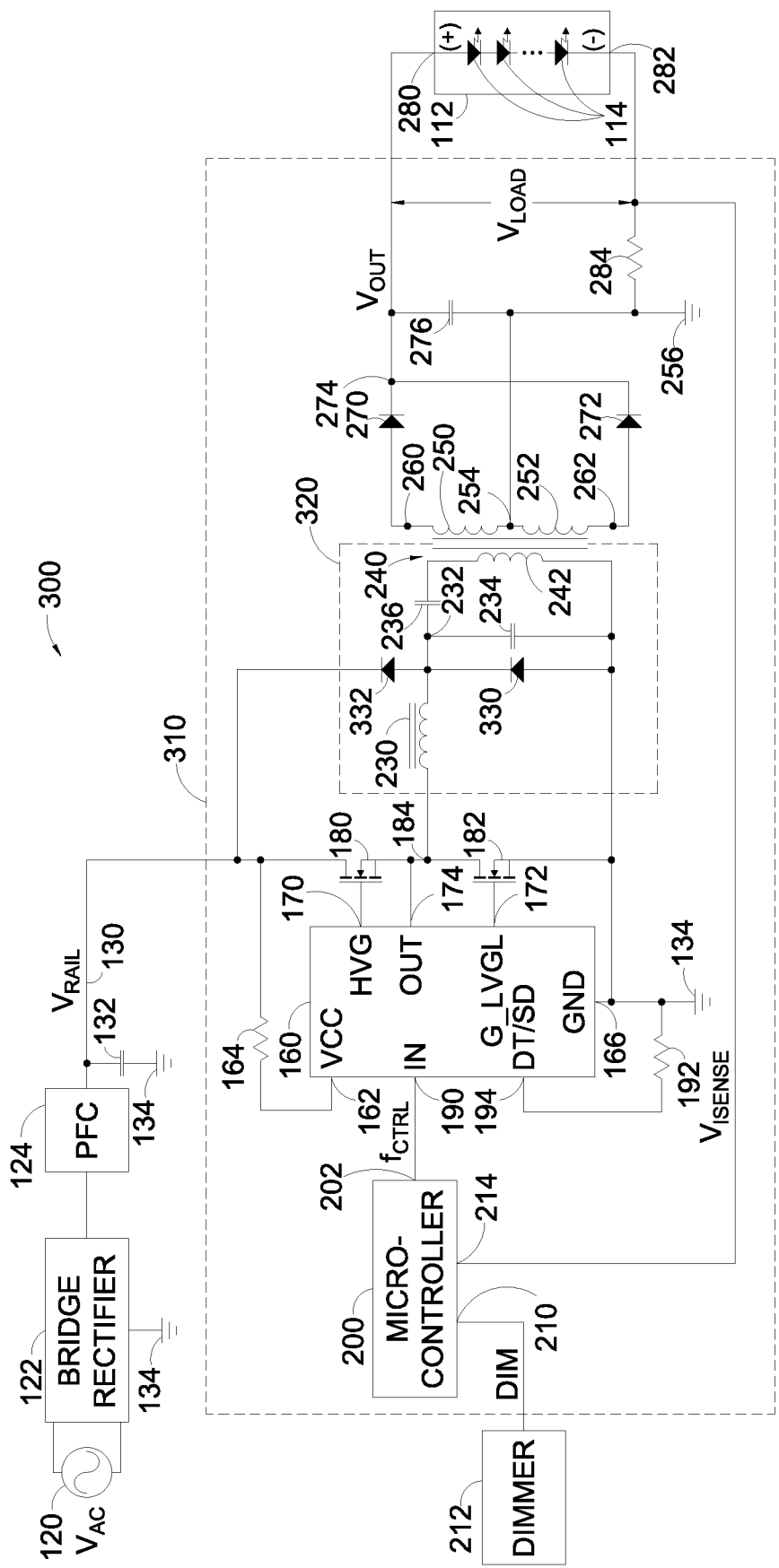

A first method and structure for preventing the DC-to-DC converter 110 from entering the hard-switching mode of operation is to clamp the voltage across the resonant capacitor 234 to the rail voltage $V_{RAIL}$ on the voltage rail 130 as shown in FIG. 2. In FIG. 2, the components corresponding to the components in FIG. 1 are connected and operate as previously described; and are numbered accordingly. The overall power supply circuit 100 of FIG. 1 is renumbered as 300 in FIG. 2 and the DC-to-DC converter 110 of FIG. 1 is renumbered as 310 in FIG. 2. The resonant tank circuit is renumbered as 320 in FIG. 2. The modifications to the power supply and to the DC-to-DC converter are within the resonant tank circuit.

In FIG. 2, the voltage across the resonant capacitor 234 is clamped by a first clamping diode 330 across the resonant capacitor. An anode of the first clamping diode is connected to the second terminal of the resonant capacitor at the primary side ground reference 134, and a cathode of the first clamping diode is connected to the first terminal of the resonant capacitor at the resonant node 232. Thus, the cathode of the first clamping diode is also connected to the second terminal of the resonant inductor 230. A second clamping diode 332 has an anode connected to the first terminal of the resonant capacitor at the resonant node and has a cathode connected to the voltage rail 130

The first clamping diode 330 and the second clamping diode 332 clamp the AC voltage generated across the resonant capacitor 234. The first clamping diode prevents the voltage on the resonant node 232 from dropping below the primary side ground reference 134 by more than one diode drop. The second clamping diode prevents the voltage on the resonant node from exceeding the rail voltage $V_{RAIL}$ on the voltage rail 130 by more than one diode drop. The voltage drops across the clamping diodes are near zero volts. Accordingly, the peak-to-peak voltage on the resonant node cannot exceed the magnitude of the rail voltage $V_{RAIL}$; and the peak voltage on the resonant node cannot exceed $V_{RAIL}/2$ during any of the transient abnormal conditions identified above.

The clamping provided by the first clamping diode 330 and the second clamping diode 332 increases the equivalent capacitance of the resonant capacitor 234 and causes the tank resonant frequency to decrease sufficiently low to effectively avoid hard-switching during the transient abnormal conditions identified above.

As shown in FIG. 2, the primary winding 242 of the output transformer 240 is effectively connected in parallel with the resonant capacitor 234. As discussed above, the effect of the DC blocking capacitor 236 can be ignored for AC analysis. Accordingly, the primary circuit of the output transformer is connected in parallel with the resonant capacitor. Since the voltage across the resonant capacitor is clamped by the two clamping diodes 330, 332, the primary voltage across the primary winding is also clamped by the two clamping diodes. The secondary voltages on the two secondary windings 250, 252 are also effectively clamped. Clamping the voltages across the secondary primary windings limits the voltage output range of the DC-to-DC converter, which is not desirable. Accordingly, a solution to this undesirable result is needed.

The following analysis of the operation of the DC-to-DC converter 110 of FIG. 1 and the subsequent analysis of the DC-to-DC converter 310 of FIG. 2 are helpful to understand the undesirable characteristics of the two DC-to-DC converters of FIGS. 1 and 2. The undesirable characteristics are ameliorated by an improved DC-to-DC converter described below with respect to FIG. 5.

Figure 3:
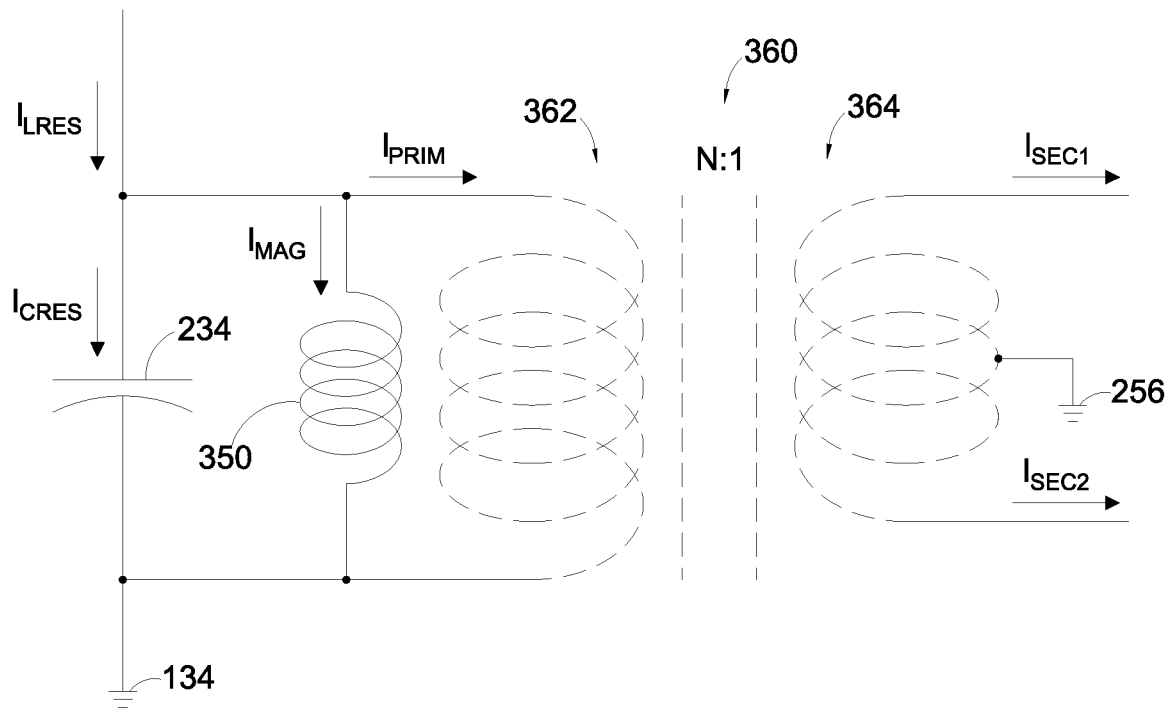

The resonant capacitor 234, the primary winding 242 of the output transformer 240 and the secondary windings 250, 252 of the output transformer are represented in FIG. 3 with ideal components. The primary winding is shown as a magnetizing inductance 350 in parallel with an ideal primary winding 362 of an ideal (lossless) transformer 360 having an ideal secondary winding 364, which represents the first secondary winding 250 and the second secondary winding 252 of FIGS. 1 and 2. The windings of the ideal transformer are considered as having no inductance. A resonant capacitor current $I_{CRES}$ flows through the resonant capacitor 234. A magnetizing current $I_{MAG}$ flowing through the magnetizing inductance. A primary current $I_{PRIM}$ flows through the ideal primary winding. The three currents are in parallel. A first secondary current $I_{S1}$ and a second secondary current $I_{S2}$ flow through the respective portions of the center-tapped ideal secondary winding. Together, the two secondary currents comprise a total secondary current $I_{SEC}$. The primary winding and the secondary winding have a turns ratio of N:1 (e.g., N primary turns for each secondary turn).

As shown in FIG. 3, a resonant inductor current $I_{LRES}$ flows from the resonant inductor 230 (FIGS. 1 and 2). The resonant inductor current is the sum of the resonant capacitor current $I_{CRES}$, the magnetizing current $I_{MAG}$ of the output transformer 240 and the primary current $I_{PRIM}$ of the output transformer as determined in accordance with the following equation:

$$I_{LRES} = I_{CRES} + I_{MAG} + I_{PRIM} \quad (1)$$

The primary current $I_{PRIM}$ of the output transformer 240 is the reflected secondary current from the secondary windings 250, 252 to the primary winding 242. Accordingly, the primary current is determined as:

$$I_{PRIM} = \frac{I_{SEC}}{N} \quad (2)$$

In Equation (2), N is equal the number of primary turns $N_P$ divided by the number of secondary turns $N_s$ (i.e., $N=N_P/N_S$).

The secondary current $I_{SEC}$ is the equivalent AC current calculated from the output DC current $I_{OUT}$:

$$I_{SEC} = \frac{I_{OUT} \times \pi}{2 \times \sqrt{2}} \quad (3)$$

Figure 4:
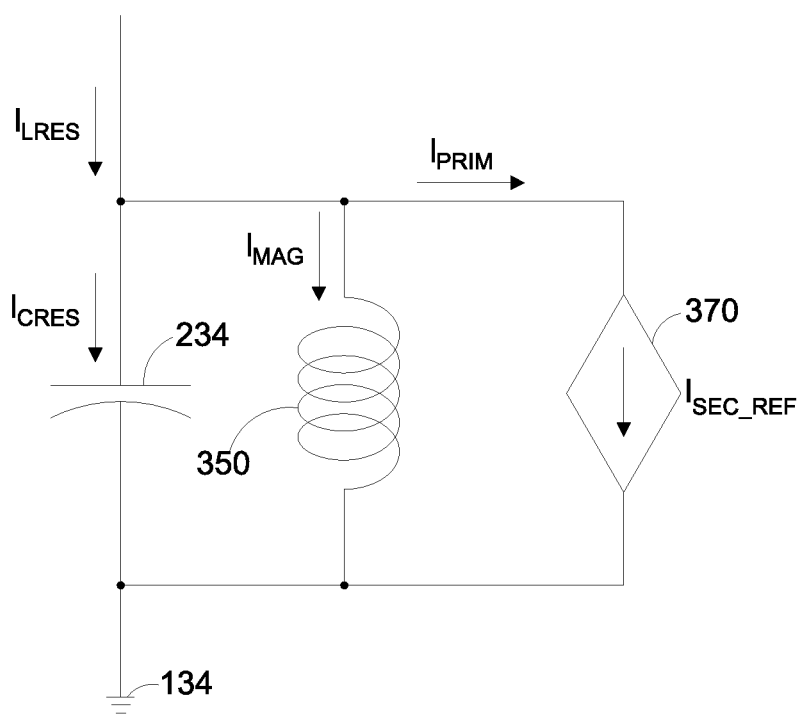

The equivalent circuit of FIG. 3 is shown in FIG. 4 with the reflected secondary current represented as a current source 370 that produces a current corresponding to the reflected secondary current $I_{SEC\_REF}$. The current provided by the current source corresponds to the reflected current through the ideal primary winding of FIG. 3. In FIG. 4, the reflected secondary current $I_{SEC\_REF}$ from the secondary winding to the primary winding has the following relationship:

$$I_{SEC\_REF} = \frac{I_{SEC}}{N} = \frac{I_{OUT} \times \pi}{2 \times \sqrt{2} \times N} = I_{PRIM} \quad (4)$$

Using the relationship shown in FIG. 4, Equation (1) can be rewritten as follows:

$$I_{LRES} = I_{CRES} + I_{MAG} + \frac{I_{OUT} \times \pi}{2 \times \sqrt{2} \times N} \quad (5)$$

Typically, $I_{CRES}$ and $I_{MAG}$ are much smaller compared to $I_{SEC\_REF}$. Accordingly, $I_{SEC\_REF}$ dominates the resonant current flowing through the resonant inductor.

When the output current $I_{OUT}$ is fixed, the turns ratio N determines $I_{SEC\_REF}$, as well as $I_{LRES}$. Increasing N decreases the resonant current for any magnitude of the output current. Minimizing the resonant inductor current is advantageous because a lower resonant current allows the size of the resonant inductor 230 to be smaller. Furthermore, the first MOSFET 180 and the second MOSFET 182 can have lower power ratings and be physically smaller because half of the resonant current flows through each MOSFET. Decreasing the sizes of the inductor and the MOSFETs results in a higher driver efficiency and reduces the total cost of the DC-to-DC converter 110 of FIG. 1. Accordingly, maximizing the turns ratio N is desirable.

The turns ratio N is also related to the DC output voltage $V_{OUT}$ applied to the DC load 112 from the secondary output node 274. The DC output voltage is limited by the configuration of the LEDs 114 in the DC load. Accordingly, the turns ratio is limited by the maximum DC output voltage that can be applied as the load voltage $V_{LOAD}$ to the DC load. The maximum DC output voltage $V_{OUT\_MAX}$ from the secondary output node of the DC-to-DC converter 110 shown in FIG. 1 is defined as:

$$V_{OUT\_MAX} = V_{CRES\_MAX} \times \frac{2 \times \sqrt{2}}{\pi \times N} \qquad (6)$$

For a constant power driver, the range of magnitudes of the output voltage $V_{OUT}$ is defined as being between the maximum output voltage $V_{OUT\_MAX}$ and a minimum output voltage $V_{OUT\_MIN}$. The output current through the DC load 112 is defined between a maximum output current $I_{OUT\_MAX}$ and a minimum output current $I_{OUT\_MIN}$. For example, for a 180-watt constant power driver, the voltage output ranges corresponding to minimum and maximum current ranges of 1.4 amperes and 2 amperes, respectively, are shown in the following Table I:

TABLE I

|  | $V_{OUT\_MAX}$ 130 Volts | $V_{OUT\_MIN}$ 90 Volts |
| --- | --- | --- |
| $I_{OUT}$ | 1.4 Amperes | 2 Amperes |
| $P_{OUT}$ | 180 Watts | 180 Watts |

For the DC-to-DC converter 110 shown in FIG. 1, the voltage across the resonant capacitor 234 can have a wide range of magnitudes as long as the overall resonant tank circuit remains inductive for the load application. However, the tank circuit illustrated in FIG. 1 does not have inherent protection against hard-switching during a transient abnormal condition such as sudden load removal. This lack of protection causes the DC-to-DC converter of FIG. 1 to be undesirable for incorporation into a highly reliable LED driver design.

The clamped DC-to-DC converter circuit 310 shown in FIG. 2 has an inherent protection against hard-switching at any time because of the clamped resonant capacitor voltage. One disadvantage of the clamped DC-to-DC converter of FIG. 2 is that the maximum peak AC voltage across the resonant capacitor is limited to VRAIL/2 so that the maximum turns ratio N is limited to:

$$N = V_{CRES\_MAX} \times \frac{2 \times \sqrt{2}}{\pi \times V_{OUT\_MAX}} = \frac{V_{RAIL}}{2} \times \frac{2 \times \sqrt{2}}{\pi \times V_{OUT\_MAX}} \qquad (7)$$

To provide a constant power output driver, N is selected to provide a maximum output voltage condition when a minimum output current occurs.

When the driver is programmed to operate at a minimum output voltage $V_{OUT\_MIN}$ and a maximum output current $I_{OUT\_MAX}$, the reflected secondary current to the primary winding is much higher than when the driver is operating with a maximum output voltage.

As an example of the foregoing for a 180-watt constant power driver configured as shown in FIG. 2, the value of N for a rail voltage of 470 volts and a maximum output voltage of 130 volts is calculated by the following equations derived from Equation (6):

$$N = \frac{470}{2} \times \frac{2 \times \sqrt{2}}{\pi \times 130} = 1.63 \qquad (8)$$

Using Equation (4), the magnitudes of the reflected back current $I_{SEC\_REF}$ are shown in the following Table II:

TABLE II

|  | $V_{OUT\_MAX}$ 130 Volts | $V_{OUT\_MIN}$ 90 Volts |
| --- | --- | --- |
| $I_{OUT}$ | 1.4 Amperes | 2 Amperes |
| $I_{SEC\_REF}$ | 0.95 Amperes | 1.36 Amperes |

Table II shows that $I_{SEC\_REF}$ of 1.36 amperes at $V_{OUT\_MIN}$ of 90 volts and $I_{OUT\_MAX}$ of 2 amperes is about 43% more than $I_{SEC\_REF}$ of 0.95 amperes at $V_{OUT\_MAX}$ of 130 volts and $I_{OUT\_MIN}$ of 1.4 amperes.

The large magnitude (1.36 amperes) of the $I_{SEC\_REF}$ current at the low output voltage (90 volts) forces the resonant inductor 230 to be large to handle the thermal power loss (proportional to $I_{SEC\_REF}$ squared ($I^2_{SEC\_REF}$)) and saturation at high current. The first and second switching devices (MOSFETs) 180, 182 must have a larger current rating to accommodate the switching currents provided to the resonant inductor via the switching output node 184. The increased sizes of the resonant inductor and the switching devices causes the overall size of the power supply 100 to be larger and increases the cost of the power supply.

Increasing the turns ratio N would improve the efficiency, reduce the size and optimize the cost of the power supply 100 by reducing the reflected secondary current $I_{SEC\_REF}$ to thereby minimize the resonant current through the resonant inductor 230 and through the first and second switching devices 180, 182. To maximize the turns ratio N, the voltage across the resonant capacitor 234 is maximized first. Maximization of the voltage across the resonant capacitor should occur while still providing protection against hard-switching to maintain the reliability of the power supply 100.

Figure 5:
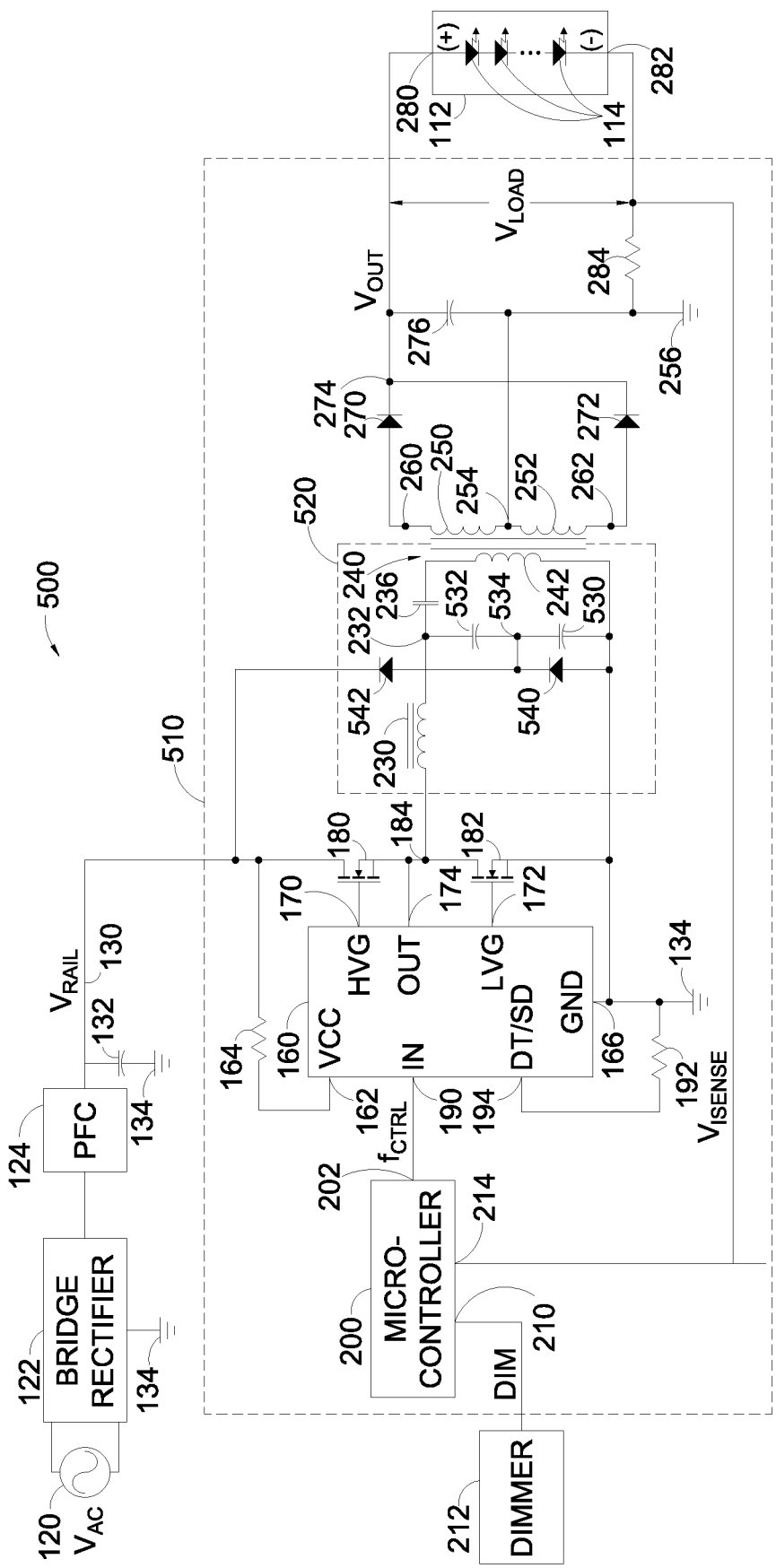

FIG. 5 illustrates a power supply circuit 500 that reduces the reflected secondary current $I_{SEC\_REF}$ through the resonant inductor 230 while providing protection against hard-switching. In FIG. 5, like components operate as previously described and have the same reference numbers. The DC-to-DC converter 510 of FIG. 5 is modified to include a modified resonant tank circuit 520. The modifications to the power supply and to the DC-to-DC converter are within the resonant tank circuit as described below.

In the resonant tank circuit 520 of FIG. 5, the single resonant capacitor 234 of FIGS. 1 and 2 is replaced with a first resonant capacitor 530 and a second resonant capacitor 532. The second resonant capacitor can also be referred to as a secondary capacitor. The two resonant capacitors are connected in series between the resonant node 232 and the primary side ground reference 134. A first terminal of the second resonant capacitor is connected to the resonant node. A second terminal of the second resonant capacitor is connected to a first terminal of the first resonant capacitor at a capacitor branch node 534. A second terminal of the first resonant capacitor is connected to the primary side ground reference. As shown in FIG. 5, the series combination of the first and second resonant capacitors is connected in parallel with the primary circuit of the output transformer 240. As discussed above, the primary circuit of the output transformer comprises the DC-blocking capacitor 236 in series with the primary winding 242.

The resonant tank circuit 520 of FIG. 5 includes a first clamping diode 540 and a second clamping diode 542. The first clamping diode has an anode connected to the primary side ground reference 134 and has a cathode connected to the capacitor branch node 534. Accordingly, the first clamping diode is connected across the first resonant capacitor 530. The second clamping diode has an anode connected to the capacitor branch node and has a cathode connected to the voltage rail 130.

As illustrated in FIG. 5, the primary winding 242 of the output transformer 240 is connected in parallel with the series combination of the first resonant capacitor 530 and the second resonant capacitor 532. As discussed above, the effect of the DC blocking capacitor 236 is not significant for AC analysis. The maximum output voltage across the primary winding is the sum of a first capacitor voltage $V_{CRES1}$ across the first resonant capacitor and a second capacitor voltage $V_{CRES2}$ across the second resonant capacitor. The sum of the two capacitor voltages is greater than the first capacitor voltage $V_{CRES1}$ at all times. Even when the first capacitor voltage $V_{CRES1}$ is clamped by the first clamping diode 540 and the second clamping diode 542, the total voltage across the primary winding 242 of the output transformer 240 is greater than the first capacitor voltage $V_{CRES1}$. As a result, the turns ratio N for the resonant tank circuit 520 of FIG. 5 determined by Equation (8) can be smaller than the turns ratio N for the resonant tank circuit 320 of FIG. 2.

In the embodiment illustrated in FIG. 5, the second clamping diode 542 forces the voltage across the main (first) resonant capacitor 530 to be an AC voltage having a positive DC offset of $V_{RAIL}/2$.

When the load voltage $V_{LOAD}$ across the DC load 112 is small, neither the first clamping diode 540 nor the second clamping diode 542 clamps the first resonant capacitor 530 or the second resonant capacitor 532. As a result, the first resonant capacitor and the second resonant capacitor are connected in series and form an effective single resonant capacitor having a total capacitance $C_{RES\_TOTAL\_UNCLAMPED}$ determined by the following well-known relationship for series-connected capacitors:

$$C_{RES\_TOTAL\_UNCLAMPED} = \frac{C_{RES1} \times C_{RES2}}{C_{RES1} + C_{RES2}} \quad (9)$$

When the voltage $V_{LOAD}$ across the DC load 112 is at a maximum magnitude, the first clamping diode 540 and the second clamping diode 542 actively clamp the voltage across the first resonant capacitor 530 to assure that the half-bridge switch (e.g., the first switching device 180 and the second switching device 182) remain in a soft-switching operational mode. The total resonant capacitance $C_{RES\_TOTAL\_CLAMPED}$ is determined by the following relationship:

$$C_{RES\_TOTAL\_CLAMPED} = \frac{C_{RES2} \times C_{RES1\_EQUIV}}{C_{RES2} + C_{RES1\_EQUIV}} \quad (10)$$

In Equation (10), $C_{RES1\_EQUIV}$ is the equivalent capacitance of the first resonant capacitor 530 when the first clamping diode 540 and the second clamping diode 542 are actively clamping the voltage at the capacitor branch node 534 and are thus clamping the voltage across the first resonant capacitor with respect to the primary side ground reference 134. Increasing the rail voltage $V_{RAIL}$ increases the clamping effect of the two clamping diodes and causes the top (higher voltage levels) of the voltage waveform across the first resonant capacitor to have a flatter (less sinusoidal) appearance. Increasing the clamping effect causes the equivalent capacitance $C_{RES1\_EQUIV}$ of the first resonant capacitor to increase. Accordingly, the equivalent capacitance $C_{RES1\_EQUIV}$ of the first resonant capacitor when clamped is always greater than the capacitance $C_{RES1}$ when the first resonant capacitor is not clamped.

Comparing Equations (9) and (10) shows that the magnitude of the clamped total capacitance $C_{RES\_TOTAL\_CLAMPED}$ is always greater than the magnitude of the unclamped total capacitance $C_{RES\_TOTAL\_UNCLAMPED}$.

Figure 6:
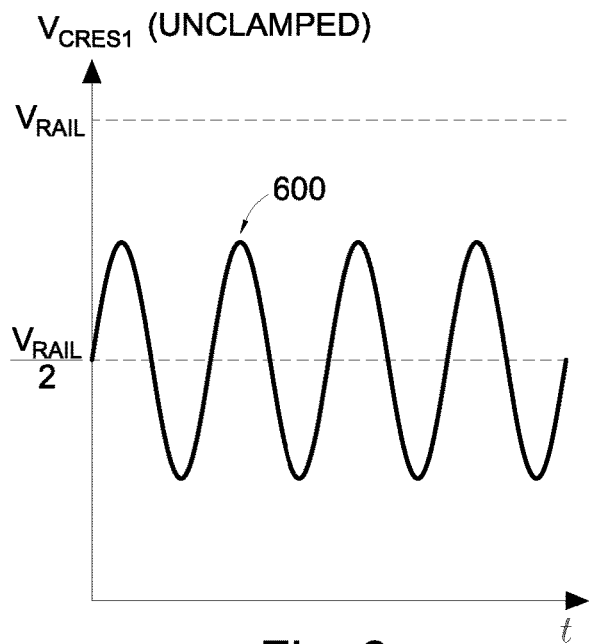
FIG. 6 illustrates a waveform of the voltage across the first resonant capacitor of FIG. 5 when the first and second diodes of FIG. 5 are not clamping.
Figure 7:
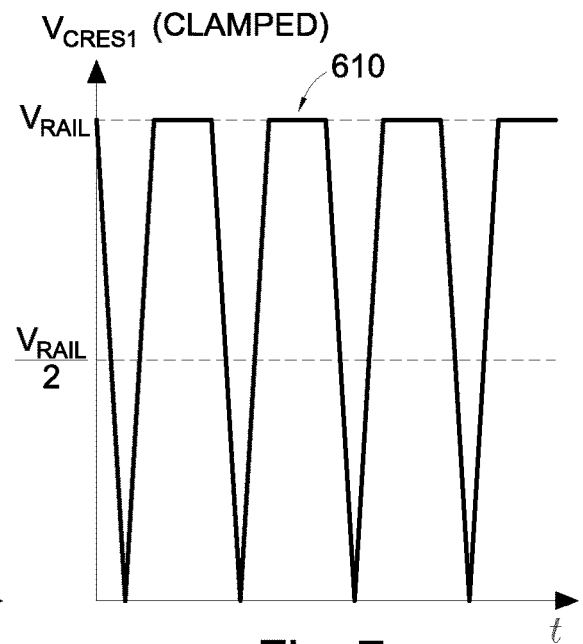
FIG. 7 illustrates a waveform of the voltage across the first resonant capacitor of FIG. 5 when the first and second diodes of FIG. 5 are clamping.

FIG. 6 illustrates a waveform 600 of the voltage $V_{CRES1}$ across the first resonant capacitor 530 when the first clamping diode 540 and the second clamping diode 542 are not clamping the first resonant capacitor. FIG. 7 illustrates a waveform 610 of the voltage $V_{CRES1}$ across the first resonant capacitor when the first clamping diode and the second clamping diode are clamping the first resonant capacitor.

Figure 8:
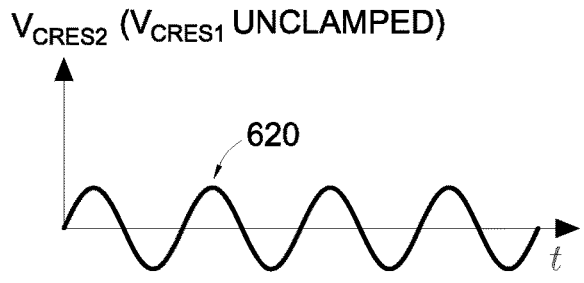
FIG. 8 illustrates a waveform of the voltage across the second resonant capacitor of FIG. 5 when the first and second diodes of FIG. 5 are not clamping.
Figure 9:
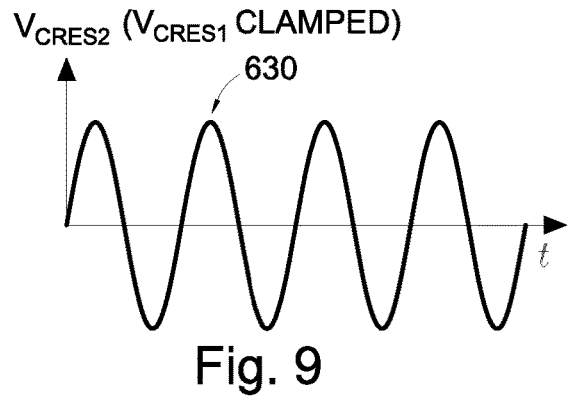
FIG. 9 illustrates a waveform of the voltage across the second resonant capacitor of FIG. 5 when the first and second diodes of FIG. 5 are clamping.

FIG. 8 illustrates a waveform 620 of the voltage $V_{CRES2}$ across the second resonant capacitor 532 when the first clamping diode 540 and the second clamping diode 542 are not clamping the first resonant capacitor 530. FIG. 9 illustrates a waveform 630 of the voltage $V_{CRES2}$ across the second resonant capacitor when the first clamping diode and the second clamping diode are clamping the first resonant capacitor.

Figure 10:
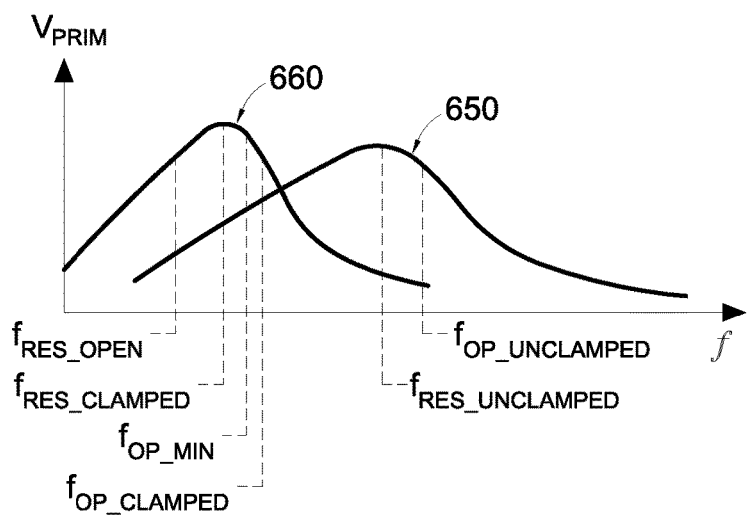
FIG. 10 illustrates a first primary voltage ($V_{PRIM}$) versus switching frequency (f) curve of the power supply of FIG. 5 when first and second diodes in the resonant tank circuit are not clamping and illustrates a second primary voltage versus switching frequency curve when the first and second diodes are clamping.

FIG. 10 illustrates a first graph 650 of the magnitude of a voltage $V_{PRIM}$ across the primary winding 242 of the output transformer 240 when the first resonant capacitor 530 is not clamped by the first clamping diode 540 and the second clamping diode 544. FIG. 10 further illustrates a second graph 660 of the magnitude of the voltage $V_{PRIM}$ across the primary winding of the output transformer when the first resonant capacitor is clamped by the first clamping diode and the second clamping diode. Both graphs are plotted with respect to a switching frequency f. The first graph 650 and the second graph 660 in FIG. 10 are also referred to herein as gain curves because the graphs represent voltages with respect to frequency.

As shown in FIGS. 6 and 8, when the first and second clamping diodes 540, 542 are not clamping, the waveform 600 of the voltage $V_{CRES1}$ across the first resonant capacitor 530 and the waveform 620 of the voltage $V_{CRES2}$ across the second resonant capacitor 532 are both substantially sinusoidal waveforms. The waveform of the voltage $V_{CRES2}$ across the second resonant capacitor varies sinusoidally about the 0-volt baseline. The waveform of the voltage $V_{CRES1}$ across the first resonant capacitor varies sinusoidally about a DC offset of approximately $V_{RAIL}/2$ because of the effect of the first clamping diode 540 in parallel with the first resonant capacitor. In the illustrated embodiment, the peak-to-peak magnitude of the voltage $V_{CRES1}$ across the first resonant capacitor is greater than the peak-to-peak magnitude of the voltage $V_{CRES2}$ across the second resonant capacitor. As shown in FIG. 10, the first graph 650 of the primary voltage $V_{PRIM}$ has a peak magnitude at a resonant frequency of $f_{RES\_UNCLAMPED}$. An operating frequency $f_{OP\_UNCLAMPED}$ is selected to be greater than the resonant frequency $f_{RES\_UNCLAMPED}$ to assure that the half-bridge is operating in the soft-switching mode.

As illustrated by the waveform 610 in FIG. 7, when the first and second clamping diodes 540, 542 are clamping the first resonant capacitor 530, the voltage $V_{CRES1}$ across the first resonant capacitor is clamped and appears as a quasi-square waveform. The waveform has a flat top and rapid rising and falling edges. The voltage $V_{CRES1}$ varies from approximately 0 volts to approximately $V_{RAIL}$ volts and continues to vary about an offset voltage of approximately $V_{RAIL}/2$.

As shown by the waveform 630 in FIG. 9, when the first and second clamping diodes 540, 542 are clamping the first resonant capacitor 530, the voltage $V_{CRES2}$ across the second resonant capacitor 532 continues to be substantially sinusoidal about the 0-volt baseline; however, the voltage $V_{CRES2}$ in the clamped condition is greater than the voltage $V_{CRES2}$ in the unclamped condition illustrated in FIG. 8.

As illustrated by the second graph 660 of the magnitude of the voltage $V_{PRIM}$ across the primary winding 242 of the output transformer 240, when the first and second clamping diodes 540, 542 are clamping the first resonant capacitor 530, the gain curve shifts to a lower range of frequencies around a lower resonant frequency $f_{RES\_CLAMPED}$. An operating frequency $f_{OP\_CLAMPED}$ is selected to be greater than the clamped resonant frequency $f_{RES\_CLAMPED}$ to assure that the half-bridge continues to operate in the soft-switching mode. As illustrated in FIG. 10, $f_{RES\_CLAMPED}$ is always a lower frequency than $f_{RES\_UNCLAMPED}$ because $C_{RES\_TOTAL\_CLAMPED}$ is always greater than $C_{RES\_TOTAL\_UNCLAMPED}$.

The capacitance $C_{RES1\_EQUIV}$ of the first resonant capacitor 530 when the first and second clamping diodes 540, 542 are clamping is much greater than the unclamped capacitance $C_{RES1}$ of the first resonant capacitor. Under this condition ($C_{RES1\_EQUIV} \gg C_{RES1}$), the maximum total resonant capacitance $C_{RES\_TOTAL\_CLAMPED}$ determined in accordance with Equation (10) is approximately equal to the capacitance $C_{RES2}$ of the second resonant capacitor 532.

When the first and second clamping diodes 540, 542 are clamping very hard as illustrated in FIG. 7, the waveform of the voltage $V_{CRES1}$ across the first resonant capacitor 530 appears as a quasi-square wave with a flat top and with rapidly transitioning rising and falling edges. As the time during which the voltage is at the magnitude of the highest voltage (e.g., $V_{RAIL}$) increases and the time during which the voltage is approximately at 0 volt decreases, the voltage $V_{CRES1}$ has the effect of being almost constant at the highest voltage. Because the voltage $V_{CRES1}$ is effectively unchanging throughout each switching cycle, the equivalent capacitance of the first resonant capacitor becomes quite large such that the energy stored by the first resonant capacitor does not change as the overall current in the resonant tank circuit 520 changes in each switching cycle.

If the capacitance $C_{RES2}$ of the second resonant capacitor 532 is set sufficiently high, the open load resonant frequency $f_{RES\_OPEN}$ of the resonant tank circuit 520 satisfies the following relationship:

$$f_{RES\_OPEN} = \frac{1}{2 \times \pi \times \sqrt{L_{RES} \times C_{RES2}}} < f_{OP\_MIN} \quad (11)$$

The resonant tank circuit 520 also soft-switches in any load condition if the resonant tank circuit has the following characteristics as shown in FIG. 10:

(1) The minimum operating frequency is always greater than the open load resonant frequency ($f_{OP\_MIN} > f_{RES\_OPEN}$);
(2) The operating frequency is greater than the tank resonant frequency when the resonant tank circuit is not clamped by the first and second clamping diodes 540, 542 ($f_{OP\_UNCLAMPED} > f_{RES\_UNCLAMPED}$); and
(3) The operating frequency is greater than the tank resonant frequency when the resonant tank circuit is clamped by the first and second clamping diodes 540, 542 ($f_{OP\_CLAMPED} > f_{RESCLAMPED}$).

The microcontroller 200 is programmed to control the operating frequency in response to the magnitude of the output current as fed back to the microcontroller via the $V_{SENSE}$ signal. The microcontroller adjusts the operating frequency to assure that the three characteristics are maintained.

The foregoing description and the accompanying drawings illustrate an optimized partially clamped resonant tank circuit 520 for a constant power type LED driver 500. The resonant tank circuit includes the partially clamped first resonant capacitor 530 in series with the unclamped second capacitor 532. The two capacitors provide the input to the primary winding 242 of the output transformer 240. The configuration of the two capacitors allows the turns ratio N of the primary winding to the second windings 250, 252 to be maximized, which minimizes the reflected primary current and improves the efficiency of the constant power type LED driver. The configuration of the two capacitors provides a higher input voltage to the output transformer to allow the range of output voltages from the secondary of the output transformer to be greater than the range of a conventional simple-clamped tank. The capacitance of the unclamped resonant capacitor is selected to assure that the resonant tank circuit operates to provide soft-switching of the first and second switching devices 180, 182.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:
1. A resonant tank circuit, the resonant tank circuit having an input configured to connect to an output node of a half-bridge driver circuit that drives the output node between a rail voltage on a voltage rail and a reference voltage on a voltage reference, the resonant tank circuit having an output configured to connect to a primary circuit of an output transformer, the resonant tank circuit comprising:
   a resonant inductor having a first terminal connected to the input of the resonant tank circuit and having a second terminal connected to the output of the resonant tank circuit;
   a first capacitor having a first terminal connected to the voltage reference and having a second terminal connected to a capacitor branch node;
   a second capacitor having a first terminal connected to the capacitor branch node and having a second terminal connected to the resonant tank output node;
   a first diode connected across the first capacitor from the voltage reference to the capacitor branch node; and
   a second diode connected from the capacitor branch node to the voltage rail.

2. The resonant tank circuit as defined in claim 1, wherein:
the voltage reference is a circuit ground and wherein the rail voltage is a positive voltage with respect to the circuit ground;
an anode of the first diode is connected to the circuit ground and a cathode of the first diode is connected to the capacitor branch node; and
an anode of the second diode is connected to the capacitor branch node and a cathode of the second diode is connected to the rail voltage.

3. A DC-to-DC converter that receives a rectified DC voltage on a voltage rail and that generates a DC output voltage, the DC-to-DC converter comprising:
a gate driver circuit that drives at least a first switching device and a second switching device, the first switching device connected between the voltage rail and a switching node, the second switching device connected between the switching node and a voltage reference;
a tank circuit having an input connected to the switching node and having an output connected to a resonant tank output node, the resonant tank circuit comprising:
a resonant inductor having a first terminal connected to the switching node and having a second terminal connected to the resonant tank output node;
a first capacitor having a first terminal connected to the voltage reference and having a second terminal connected to a capacitor branch node;
a second capacitor having a first terminal connected to the capacitor branch node and having a second terminal connected to the resonant tank output node;
a first diode connected across the first capacitor between the voltage reference and the capacitor branch node; and
a second diode connected from the capacitor branch node to the voltage rail;
an output transformer having a primary circuit and a secondary circuit, the primary circuit having a first terminal connected to the resonant tank output node and having a second terminal connected to the voltage reference; and
a rectifier circuit connected to the secondary circuit of the output transformer, the rectifier circuit generating the DC output voltage.

4. The DC-to-DC converter as defined in claim 3, wherein:
the voltage reference is a circuit ground and wherein the rail voltage is a positive voltage with respect to the circuit ground;
an anode of the first diode is connected to the circuit ground and a cathode of the first diode is connected to the capacitor branch node; and
an anode of the second diode is connected to the capacitor branch node and a cathode of the second diode is connected to the rail voltage.

5. The DC-to-DC converter as defined in claim 3, wherein:
the primary circuit of the output transformer has a primary winding and the secondary circuit of the transformer has at least one secondary winding, the primary winding having N turns for each turn of the secondary winding; and
the first and second diodes of the resonant tank circuit enable a value of N to be optimized to a large value to maximize a voltage applied to the primary winding and to minimize a current through the primary winding.

6. The DC-to-DC converter as defined in claim 3, wherein the primary circuit of the output transformer includes a DC-blocking capacitor in series with the primary winding.

7. A method for preventing hard-switching of at least first and second switching devices in a half-bridge circuit in a DC-to-DC converter that receives an input voltage from a voltage rail, the input voltage referenced to a reference voltage from a voltage reference, the method comprising:
providing an output of the half-bridge circuit to a resonant tank circuit, the resonant tank circuit comprising a resonant inductor having an input connected to the output of the half-bridge circuit and having an output connected to a primary circuit of an output transformer;
connecting a first capacitor and a second capacitor in series between the output of the resonant inductor and the voltage reference, the first and second capacitors connected at a capacitor branch node;
connecting a first diode across the first capacitor between the voltage reference and the capacitor branch node;
connecting a second diode from the capacitor branch node to the voltage rail; and
clamping a voltage on the first capacitor at the capacitor branch node to prevent the voltage on the first capacitor from exceeding the input voltage by more than a voltage drop of the second diode and to prevent the input voltage from being less than the reference voltage by more than a voltage drop of the first diode, wherein clamping the voltage across the first capacitor prevents hard-switching of the switching devices in the half-bridge circuit.

8. The method as defined in claim 7, wherein:
the resonant tank circuit has a first resonant frequency when the first and second diodes are not clamping the voltage on the first capacitor at the capacitor branch node; and
the resonant tank circuit has a second resonant frequency when the first and second diodes are clamping the voltage on the first capacitor at the capacitor branch node, the second resonant frequency lower than the first resonant frequency.

9. The method as defined in claim 7, wherein:
the voltage reference is a circuit ground and wherein the input voltage is a positive voltage with respect to the circuit ground;
the first diode has a cathode connected to the circuit ground and has an anode connected to the capacitor branch node; and
the second diode has an anode connected to the capacitor branch node and has a cathode connected to the voltage rail.

10. The method as defined in claim 7, wherein:
the primary circuit of the output transformer has a primary winding;
a secondary circuit of the transformer has at least one secondary winding, the primary winding having N turns for each turn of the secondary winding; and
the first and second diodes of the resonant tank circuit enable a value of N to be optimized to a large value to maximize a voltage applied to the primary winding and to minimize a current through the primary winding.

11. The method as defined in claim 10, wherein the primary circuit of the output transformer includes a DC-blocking capacitor in series with the primary winding.

* * * * *